No. 770,548. PATENTED SEPT. 20, 1904.
A. DE W. WHITTEMORE.
TANK CAR INDICATOR.
APPLICATION FILED MAY 12, 1903.
NO MODEL.
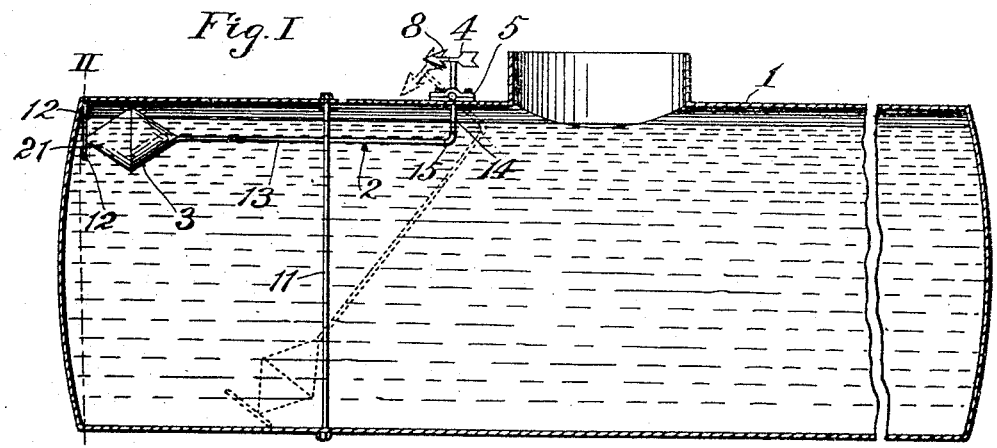
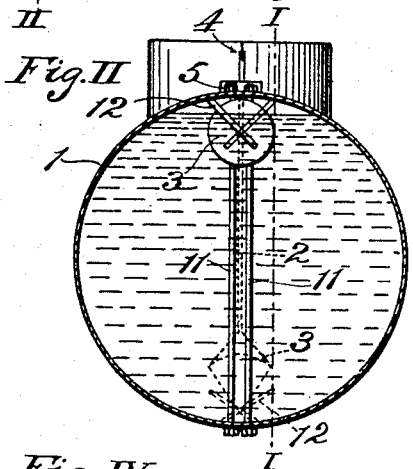
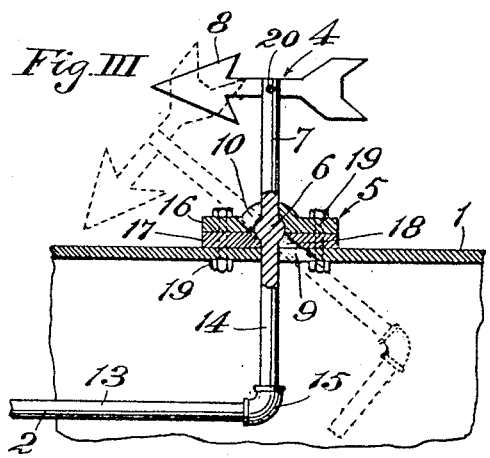
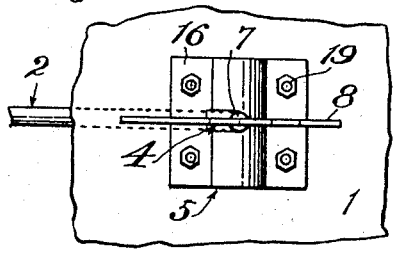
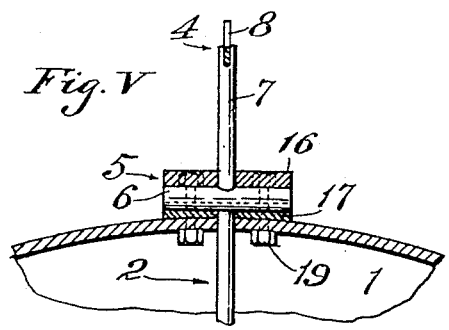
Witnesses:
C. C. Holly
J. Townsend
Inventor:
Arthur D. Whittemore
by Townsend Bros
his attys No. 770,548. Patented September 20, 1904.

UNITED STATES PATENT OFFICE.

ARTHUR DE WITT WHITTEMORE, OF REDLANDS, CALIFORNIA.

TANK-CAR INDICATOR.

SPECIFICATION forming part of Letters Patent No. 770,548, dated September 20, 1904.

Application filed May 12, 1903. Serial No. 156,762. (No model.)

*To all whom it may concern:*

Be it known that I, ARTHUR DE WITT WHITTEMORE, a citizen of the United States, residing at Redlands, in the county of San Bernardino and State of California, have invented a new and useful Tank-Car Indicator, of which the following is a specification.

This invention is applicable for use in tank-cars, tank-wagons, and the like.

An object of this invention is to provide simple and effective means for indicating the level to which the tank is filled with oil, water, or other liquid.

The accompanying drawings illustrate the invention.

Figure I is a longitudinal section of a tank-car constructed in accordance with this invention. Portions of the car are omitted for convenience. Fig. II is a cross-sectional elevation on line II II. Fig. III is a fragmental detail, partly in vertical mid-section, showing the manner of mounting the indicator-arm. Fig. IV is a plan of the indicator and a fragment of the tank. Fig. V is a fragmental elevation, a fragment of the tank being shown in section.

1 is a cylindrical tank-body.

2 is a pivoted arm, desirably a cylindrical rod.

3 is a float on the arm.

4 is an indicator actuated by the arm.

5 is a journal-bearing on the tank.

6 is a journal on the bearing carrying the arm 2 and the indicator which is connected therewith.

Desirably the float-actuated arm 2 is bent inside the tank, and the standard 7 of the indicator is arranged to stand upright when the float is at its highest point. (Shown in solid lines in Figs. I and II.)

8 is an index member or arrow, desirably forming a part of the indicator and arranged to stand horizontally when the float is in its uppermost position to indicate that the liquid within the tank has reached the highest desired level.

9 10 18 are recessed openings in the tank-body and journal-bearing, respectively, to allow the requisite play of the float-arm 2 and the indicator-standard 7.

Desirably the journal 6 fits its bearings 5 closely, so as to practically close the opening in the tank through which the float-arm 2 enters the tank, thus to avoid leakage by any jostling of the car. This desirable construction is made possible by combining a rod bent within the tank with means through which the rod projects and located on the top wall of the tank for pivotally mounting said rod, there being but little chance for leakage on account of the small diameter of the rod extending through and fitting within said mounting means.

11 is a guide inside the tank, desirably formed of two parallel rods, between which the float-arm 2 plays, said rods being astride said arm and extending from the top to the bottom of the tank. Said guide prevents lateral swaying of the float-arm and consequent wrenching of the journal or float-arm.

12 is an X-shaped guard fastened to the float and arranged to engage the upper and lower curved portions of the tank-wall to prevent the float from wearing by rubbing on the top of the tank when full or on the bottom when empty, also to assist to hold the float solidly in position and to prevent it from twisting and wrenching the arm 2. The arms of the X prevent the float from touching the tank. Desirably the arm 2 is formed in two sections 13 and 14, united by an elbow 15, into which the ends of the sections 13 and 14 are screwed, thus enabling the parts to be readily assembled inside the tank.

The journal-bearing may be formed of two box-blocks 16 and 17, which are respectively provided with recesses, as 10 and 18, arranged diagonally opposite each other at upper and lower quadrants of the bearing to allow movement of the arms 7 and 14.

In assembling the parts the blocks 17 may be placed in position on the tank, the arm 14 inserted down through the recessed openings 18 and 9, the block 16 placed over the stem 7, and the blocks then fastened in place by bolts 19. The indicator-arrow 8 may then be fastened in place by any suitable means, as the rivet or screw 20, then the elbow 15 may be screwed on the lower end of portion 14 of the arm, and the portion 13 of the float-arm may then be screwed into the elbow. When the tank is empty, the float-arm will be lowered, thus throwing the arrow-point 8 down. As the tank is filled the float-arm rises, thus bringing the arrow nearer and nearer the level shown in Figs. I and III. When the arrow reaches that level, it may be known that the tank is filled.

It is to be understood that this appliance is intended to be applied to the car-tanks as ordinarily constructed, but that it may be adapted to other forms of tanks without departing from the spirit of this invention. The float may be of a double-cone shape, and the X-shaped float protector or guard 12 may be mounted with the junction of the arms thereof above the outer point 21 of the float, as shown. The lower limbs of the X are desirably shorter than the upper limbs.

What I claim, and desire to secure by Letters Patent of the United States, is—

1. A tank, a bent arm projecting from the interior of the tank and pivoted to the top thereof, a pair of guide-rods astride the lower end of said rod and extending from the top to the bottom of the tank, and a float on the lower end of the pivoted rod, the upper end of said pivoted rod adapted to indicate the position of said float.

2. A tank, an arm pivoted in the top thereof, the outer end of which is provided with an indicator and the inner end with a float, and a guard on the float in position to prevent the float from engaging with the top and bottom of the tank.

3. A tank having curved walls, an indicator, a pivotal arm in the tank, a float on the arm and an X-shaped guard on the float to engage the top and bottom of the tank.

4. A tank having an opening in its top, two-part journal-bearing on the top over said opening, a rod through the opening, the upper end of which is provided with an indicating device and the intermediate portion with a journal which extends laterally from the rod and fits in said bearing, an elbow on the inner end of the rod, an arm secured in said elbow at one end, a float on the other end of the arm, and means for preventing the float from engaging with the top and bottom of the tank.

In testimony whereof I have signed my name to this specification, in the presence of two subscribing witnesses, at Redlands, in the county of San Bernardino and State of California, this 5th day of May, 1903.

ARTHUR DE WITT WHITTEMORE.

Witnesses:
T. R. ARCHER,
J. R. DOWNS.